(12) United States Patent  
Payette et al.

(10) Patent No.: US 6,709,251 B2
(45) Date of Patent: Mar. 23, 2004

(54) SELF-CONTAINED FRAMELESS ROTATING MOLD SUPPORT

(75) Inventors: Dennis J. Payette, Port Washington, WI (US); John J. Hahn, Hartford, WI (US); Brian R. Hartlmeier, Elm Grove, WI (US)

(73) Assignee: MGS Enterprises, Inc., Germantown, WI (US)

( * ) Notice: Subject to any disclaimer, the term of this patent is extended or adjusted under 35 U.S.C. 154(b) by 132 days.

(21) Appl. No.: 09/993,202

(22) Filed: Nov. 16, 2001

(65) Prior Publication Data

US 2003/0094732 A1 May 22, 2003

(51) Int. Cl.[7] .............................................. B29C 45/64
(52) U.S. Cl. ...................... 425/112; 425/576; 425/588; 425/589; 425/451.3
(58) Field of Search ................................ 425/112, 338, 425/576, 588, 589, 451.3

(56) References Cited

U.S. PATENT DOCUMENTS 4,330,257 A * 5/1982 Rees et al. .................. 425/556
4,408,981 A * 10/1983 Brown ....................... 425/589
4,734,023 A   3/1988 Nesch et al.
6,139,305 A * 10/2000 Nesch ........................ 425/130
6,155,811 A * 12/2000 Looije et al. ............... 425/190
6,171,094 B1 * 1/2001 Von Holdt .................. 425/190
6,250,906 B1 * 6/2001 Kodric ....................... 425/190
6,558,149 B1 * 5/2003 Bodmer et al. ......... 425/192 R

FOREIGN PATENT DOCUMENTS

| EP | 0 671 251 A1 | 3/1995 |
| EP | 0 922 556 A1 | 6/1999 |
| JP | 02143819 | 6/1990 |
| WO | WO 98/35808 | 8/1998 |
| WO | WO 98/38021 | 9/1998 |
| WO | WO 99/28108 | 6/1999 |

* cited by examiner

Primary Examiner—James P. Mackey
(74) Attorney, Agent, or Firm—Quarles & Brady LLP

(57) ABSTRACT

A support for rotating molds used in multi-shot injection molding provides for platen mounting of a support track that may extend beneath the molds to support the rotating mold portion. The extensible track provides a telescoping configuration that allows a long support span independent of the mold width improving mold stability and increasing potential mold separation for easy access to the mold portions.

11 Claims, 2 Drawing Sheets

SELF-CONTAINED FRAMELESS ROTATING MOLD SUPPORT

CROSS-REFERENCE TO RELATED APPLICATIONS

STATEMENT REGARDING FEDERALLY SPONSORED RESEARCH OR DEVELOPMENT

BACKGROUND OF THE INVENTION

In injection molding, a molten thermal plastic or similar material is injected into a mold having a closed cavity having outer surfaces conforming to the shape of the desired part. After injection, the mold may be separated along a parting line to release the molded part and then closed again so that the injection process may be repeated.

In multi-shot injection molding, a first shot of injected plastic is delivered to the mold and then a portion of the mold cavity is changed and a second shot of plastic is injected into the changed cavity. Multi-shot injection molding may be used to create parts having two or more different thermoplastic materials that are joined as an integral unit or that are separable after molding is complete. In this latter case, the molding process effectively pre-assembles the separate plastic components in the mold.

The reconfiguration of the mold, in between the separate injections of plastic (shots), is easily performed by rotating a portion of the mold. The rotation may bring successive portions of the mold into alignment with different injector units so that the multiple shots may be accomplished simultaneously on different portions of the mold, thereby improving machine throughput. A well known technique for mold rotation involves rotating a center portion of a three part mold along an axis perpendicular to the direction in which the mold portions separate (the mold separation direction).

During a first stage, a first material may be injected into a front cavity at the interface of a front and center portion of the mold to create a base part. At the same time, a second material may be injected into a rear cavity formed by the interface of the center and rear portions of the cavity. This rear cavity contains a base part previously molded in the front cavity and the second material over molds the part.

In a second stage, the mold portions are separated and the over molded part is ejected from the rear cavity and the mold rotated 180°. The molds portions are closed again and the process is repeated.

Rotation of the center portion of the mold about an axis perpendicular to the direction of mold separation reduces the required clamping pressure on the molds and may be contrasted to a system that rotates the molds about an axis parallel to the mold separation direction. This latter system increases the total area of the molds over which the injected plastic presses, requiring additional clamping pressure and possibly a larger injection-molding machine.

While rotating the center mold portion perpendicularly to the mold separation direction requires less total clamping pressure, greater separation of the machine platens is required to provide for mold rotation and part removal. The center mold portion is supported during separation by the tie rods, which join the platens of the injection-molding machine. The location and size of these tie rods varies between machines and thus such an approach requires that the molds be designed for a specific machine.

A variation on this approach holds the rotatable mold portion within a frame held by cantilevered lead pins extending from the front and rear mold portions and received by this frame. This approach is limited to relatively small molded parts using lightweight molds that separate only the short distance supportable by the cantilevered pins. One drawback is that the frame limits the area of the platens that may be used for the mold and thus the size of the molded part.

What is needed is a mold support system adaptable to arbitrarily large molds that does not require the use of a specific injection-molding machine.

BRIEF SUMMARY OF THE INVENTION

The present invention provides a mold support for a rotating central mold portion that is supported solely through the platen mold mounts and thus does not require extensive modification of an injection-molding machine or the use of an injection-molding machine having its tie rods in a particular location. The invention provides a frameless design in which the mold is supported from beneath on a rotating table held by rails attached to the platens. Positioning of the rails below the mold allows the rail to present a support span in the mold separation direction substantially wider than the mold itself allowing improved stability, greater mold sizes, and greater clearance when the molds are separated.

Specifically, the present invention provides a rotating mold support having a first and second platen mount attachable to the opposed platens of a standard injection molding machine and providing opposed mold attachment surfaces for first and second mold portions, respectively, and adjacent track attachment surfaces. At least one extensible support track is attached to extend between the track support areas of the first and second platen mount to span the distance between the first and second platen mount for a plurality of separations of the first and second platen mounts along a mold separation axis. A rotatable mold stage is attached to a middle part of the extensible support track and has an upper surface supporting a third mold portion for rotation about an axis perpendicular to the mold separation axis.

It is thus one aspect of the invention that it allows the frameless support of the center portion of the mold improving the capacity of an injection-molding machine to mold large parts.

It is another aspect of the invention that it allows the mold to be supported on a wide variety of different injection molding machines without extensive modification to those machines. Because the rotatable mold stage is supported by tracks held by the platen mounts, only platen mounting is required to attach the mold to a given machine.

The track attachment surfaces may be below the mold attachment surfaces so that the track is below the third mold portion. The third mold portion may be supported solely by the upper table surface during rotation.

Thus it is another aspect of the invention that it provides an extremely simple mechanism for supporting a mold portion for rotation such that allows ready access to the third mold portion.

The extensible support track may include a first and second parallel rail extending along the mold separation axis. The first parallel rail may be attached to the first platen mount and the second parallel rail may be attached to the second platen mount, and the first and second parallel rails may slidably engage with a support element over a support span, the support element forming the middle part of the extensible support track.

Thus it is another aspect of the invention that the support track may provide for telescoping action increasing its usable range.

The support span may have a width measured along the mold separation axis greater than the width of the third mold portion measured along the mold separation axis.

Thus it is another aspect of the invention that it may provide an extremely sturdy extensible support track that can provide support points much exceeding the size of the mold for improved stability against torsion and the like.

The parallel rails may have a cross-sectional height measured vertically that is more than twice their cross-sectional width measured horizontally.

It is a feature of some embodiments of the invention to allow advantageous rail cross-sections by displacing the extensible track away from the mold area.

The first and second parallel rails may include opposed racks and the support element may be positioned between the first and second parallel rails and include a gear simultaneously engaging both racks to cause the support element to move equally with respect to the first and second platen supports.

It is thus another feature of at least one embodiment of the invention that the third mold portion may be positioned to remain centered between the first and second mold portions as the latter open.

The first and second parallel rails may include opposed ways and the support element may be positioned between the first and second parallel rails and may include slides engaging the opposed ways of the first and second parallel rails to move freely along each.

It is another aspect of the invention that it provides for an improved slider mechanism over that obtained by leader pins alone.

The features and advantages may not apply to all embodiments of the inventions and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

DETAILED DESCRIPTION OF THE PREFERRED EMBODIMENT

Figure 1:
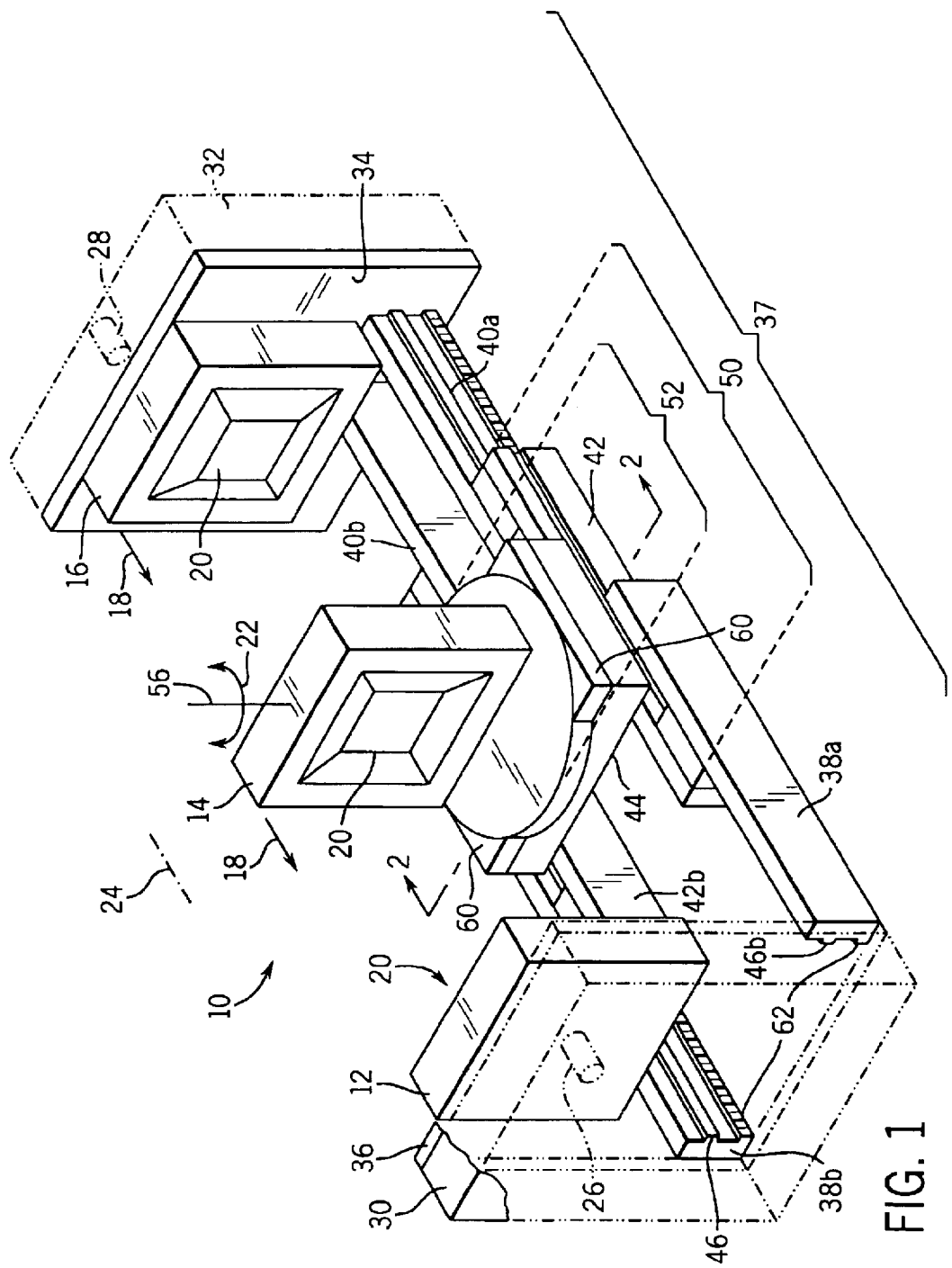
FIG. 1 is a simplified perspective view of the rotating mold support of the present invention showing platen mounts holding a first and second mold portion on an upper surface and an extensible support track on a lower surface, the latter which holds a stage rotating a central mold portion about an axis perpendicular to the separation axis of the platens.

Referring now to FIG. 1, the present invention provides a rotating mold support 10 suitable for use with multi-shot molding as described above and uses a front mold portion 12, a central mold portion 14 and a rear mold portion 16. During operation, front mold portion 12 and rear mold portion 16 are closed upon either side of central mold portion 14 along a mold separation axis 24 as indicated by arrows 18 so that central mold portion 14 is sandwiched between mold front mold portion 12 and rear mold portion 16.

Cavities 20 in the abutting faces of each mold portion 12, 14 and 16 define a first injection cavity between front mold portion 12 and central mold portion 14 and a second injection cavity between central mold portion 14 and rear mold portion 16. Thermoplastic may be injected into these cavities when mold portions 12, 14 and 16 are in closed configuration.

After injection, mold portions 12, 14 and 16 are opened and a part is ejected from the second mold cavity. Central mold portion 14 then rotates by 180° as indicated by arrow 22 and the mold portions 12, 14 and 16 are again closed together along arrows 18. The first shot may be supplied by a first injector nozzle 26 and the second shot may be provided by a second injection nozzle 28 shown positioned axially along axis 24 but subject to a number of different variations well known in the art. The passages through which the thermoplastic is conducted from the injection nozzles 26 and 28 through the front mold portion 12 and rear mold portion 16 are not shown for clarity.

The invention provides a movable support for the mold portions 12, 14 and 16 held solely by the stationary front machine platen 30 and a movable rear machine platen 32. The stationary front machine platen 30 and movable rear machine platen 32 present relatively standard mounting surfaces and include a clamping mechanism (not shown) providing a closing pressure for the mold portions 12, 14 and 16.

Referring still to FIG. 1, the invention provides a front and rear mold platen mount 34 and 36, respectively, consisting generally of plates of metal having an outer surface attachable to the front machine platen 30 or rear machine platen 32 and an opposite inner surface providing an upper area attachable to one of front mold portion 12 or rear mold portion 16.

A lower portion of the inner surface of the front and rear mold platen mount 34 holds opposite ends of an extensible support track assembly 37. The extensible support track assembly 37 consists of two parallel rail pairs made up of rails 38a and 40a, for one pair, and 38b and 40b, for the second pair, each extending generally along the axis 24. Each rail 38a, 38b, 40a, 40b has a length less than the closed separation between front machine platen 30 and rear machine platen 32 during clamping of the mold portions 12, 14, and 16 and greater than half the separation of the front machine platen 30 and rear machine platen 32 during opening of the mold portions 12, 14 and 16.

Parallel rails 38a and 38b have one end attached to a lower part of the rear mold platen mount 36 and the other end extending toward front mold platen mount 34. Similarly, parallel rails 40a and 40b have one end attached to the lower portion of front mold platen mount 34 and the remaining end extending toward rear mold platen mount 36. Rails 40a and 40b are set horizontally closer to each other than rails 38a and 38b so that they pass by each other with movement of the front machine platen 30 and rear machine platen 32 toward and away from each other.

Between rails 38a and 40a, is a third rail 42a forming a support element supporting on its upper surface a stage base 44. The rail 42a is generally parallel to rails 38a and 40a. Similarly, between rails 38b and 40b is a support element 42b also parallel to rails 38b and 40b and positioned therebetween, and also supporting on its upper surface, the stage base 44.

Figure 2:
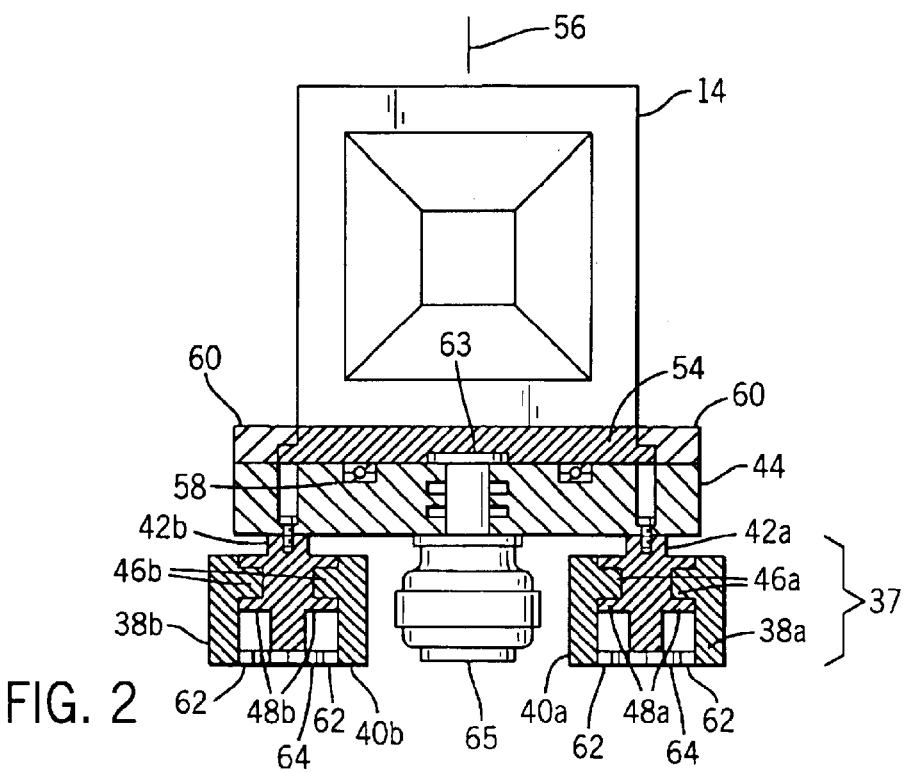
FIG. 2 is a cross-section along lines 2—2 of FIG. 1 showing the multiple parallel rails which form the extensible support track of FIG. 1 and showing an upper table surface being part of the rotatable stage and showing a motor positioned between the rails beneath the stage to rotate the table.

Referring now to FIG. 2, each of rails 38a and 40a and 40b and 38b include inwardly extending ways 46a and 46b, respectively. These ways 46a and 46b are in turn received by a pair of sliding collars 48b and 48a, the collars of each pair attached on opposite sides of rails 42b and 42a, respectively. Thus elements 42a and 42b may thus slide freely between rails 38b and 40b and rails 40a and 38a, respectively.

Figure 4:
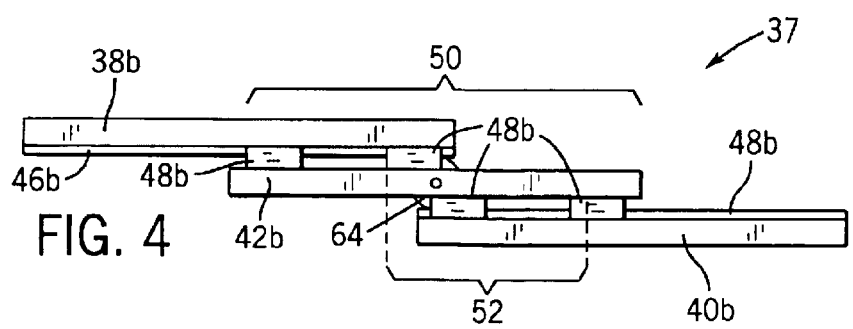
FIG. 4 is a plan view of a single rail of FIGS. 1 and 2 in full extension showing the support span over which the rails engage each other in telescoping fashion compared to the maximum mold width and such as provides improved stability to the mold portions.

Referring now to FIG. 4, it will be understood that this arrangement provides for a telescoping action of rails 38b, 42b, and 40b, and the corresponding rails 40a, 42a and 38a (not shown in FIG. 4) that allows them to extend nearly twice the length of each of the rails 38b and 40b and to compress nearly to the length of one of rails 38b or 40b. Further, however, it will be understood that the support span 50 defined as the outermost engagements between collars 48b extending between rails 38b, 42b, and 40b (and that corresponding distance on 38b, 42b, and 40b) may be substantially wider than the width 52 of the central mold portion 14 as shown also in FIG. 1. This allows for greater separation of the central mold portions 14 from front mold portion 12 and rear mold portion 16, and for greater resistance to torsion, independent of the width of the central mold portion 14 which limits the length of received lead pins or the like.

It will be understood that additional intermediate rails, slidably engaging with adjacent rails, may be added to the telescoping set of rails 38b, 42b, and 40b, and the corresponding rails 40a, 42a and 38a to provide for even greater extension.

Figure 3:
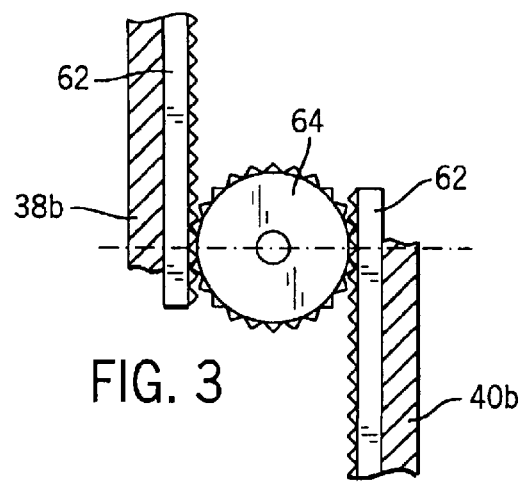
FIG. 3 is a fragmentary plan view of a gear mechanism joining racks attached to the rails of FIG. 2 and operating to position the rotatable stage equally between the platens regardless of their separation.

Referring again to FIGS. 1 and 2, the stage base 44 as held on the tops of rails 42a and 42b provides a turntable 54 supported for rotation about a vertical axis 56 by bearing 58 fitting between the base 44 and turntable 54. The turntable 54 is disc-shaped and retained at its edges by gibs 60 and at its center by a shaft 63 driven by a motor 65, the latter which effects rotation of the central mold portion 14. Referring now to FIGS. 1, 2 and 3, extending inward from each of the rails 38b, 40b, and 40a and 38a, respectively, below the ways 46b and 46a, are racks 62. These racks engage opposite edges of a gear 64 positioned at the bottom of the rails 42b and 42a. This engagement causes any movement of rail 42b (or 42a) with respect to rail 38b (40a) to be equal to the movement between rail 42b (42a) and rail 40b (38a). In this way, the stage base 44 is always kept equidistant between the front machine platen 30 and rear machine platen 32.

As seen in FIGS. 1 and 2, the cross section of the rails 38a, 38b, 42a, 42b, 40a, and 40b is substantially taller than it is wide providing for good resistance against downward bending of the rails while decreasing the total width of the support structure of extensible support track assembly 37. Generally, the height will be more than twice the width of the rails.

It will be seen from FIG. 1, that the central mold portion 14 is readily accessible from three sides. The present structure provides ample separation of the mold portion 12, 14, and 16 so that parts can be ejected between mold portions, however, the elimination of the frame around the mold also allows a 90° rotation of the central mold portion 14, and thus permits ejection of the parts to the side or the loading of inserts.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A rotating mold support comprising:

first and second platen mounts attachable to the opposed platens of a injection-molding machine and providing opposed mold attachment surfaces for a first and second mold portion, respectively, and adjacent track attachment surfaces;

at least one extensible support track attached to and extending between the track attachment surfaces of the first and second platen mounts to span the distance between the first and second platen mounts for a plurality of separations of the first and second platen mounts along a mold separation axis;

a rotatable mold stage attached to a middle part of the extensible support track and having a table surface supporting a third mold portion for rotation about an axis perpendicular to the mold separation axis;

whereby frameless mold support may be obtained without modification to or dependence on the injection-molding machine.

2. The rotating mold support of claim 1 wherein the mold attachment surfaces are above the track attachment surfaces on each of the first and second platen mounts.

3. The rotating mold support of claim 2 wherein the table surface is upward facing and wherein the third mold portion is supported solely by the table surface during rotation.

4. The rotating mold support of claim 1 wherein the extensible support track includes first and second parallel rails extending along the mold separation axis, wherein the first parallel rail is attached to the first platen mount and the second parallel rail is attached to the second platen mount, wherein the first and second parallel rails slidably engage with a support element over a support span, the support element forming the middle part of the extensible support track.

5. The rotating mold support of claim 4 wherein the support span has a width measured along the mold separation axis greater than a width of the third mold portion measured along the mold separation axis.

6. The rotating mold support of claim 4 wherein the parallel rails have a cross-sectional height measured vertically that is more than two times their cross-sectional width measured horizontally.

7. The rotating mold support of claim 4 wherein first and second parallel rails include opposed racks and wherein the support element is positioned between the first and second parallel rails, and the support element includes a gear simultaneously engaging both racks to cause the support element to move equally with respect to the first and second platen mounts.

8. The rotating mold support of claim 4 wherein the first and second parallel rails include opposed ways and wherein the support element is positioned between the first and second parallel rails and the support element include slides engaging the opposed ways of the first and second parallel rails to move freely along each.

9. The rotating mold support of claim 1 including at least two extensible support tracks substantially parallel to each other and displaced perpendicularly to the mold separation axis.

10. The rotating mold support of claim 1 wherein the first and second platen mounts are substantially flat plates.

11. The rotating mold support of claim 1 wherein the extensible support track includes first and second parallel rails extending along the mold separation axis, wherein the first parallel rail is attached to the first platen mount and the second parallel rail is attached to the second platen mount, wherein the first and second parallel rails slidably communicate through a set of at least two mutually sliding support element over a support span, the support elements forming the middle part of the extensible support track.

* * * * *